United States Patent [19]

Fundingsland

[11] 3,830,565

[45] Aug. 20, 1974

[54] APPARATUS FOR INTERMITTANT FEEDING OF STRIP MATERIAL

[76] Inventor: John O. Fundingsland, 1126 N. Sheridan Ave., Colorado Springs, Colo. 80909

[22] Filed: July 27, 1972

[21] Appl. No.: 275,692

[52] U.S. Cl............ 352/191, 226/57, 226/58, 352/184
[51] Int. Cl. ............................ G03b 1/22
[58] Field of Search ........ 352/184, 191; 226/55, 56, 226/57, 58

[56] References Cited
UNITED STATES PATENTS

| | | | |
|---|---|---|---|
| 2,086,554 | 7/1937 | Hoorn | 352/184 X |
| 2,606,476 | 8/1952 | Waller | 352/17 |
| 2,788,703 | 4/1957 | Holman | 226/58 |
| 2,974,840 | 3/1961 | Kuhnert | 352/173 X |
| 3,159,324 | 12/1964 | Ham | 226/58 |
| 3,397,937 | 8/1968 | Schrader | 352/169 |
| 3,447,868 | 6/1969 | Krumbein | 352/173 |

FOREIGN PATENTS OR APPLICATIONS

| | | | |
|---|---|---|---|
| 643,390 | 9/1950 | Great Britain | 352/184 |

*Primary Examiner*—Monroe H. Hayes

[57] ABSTRACT

Apparatus for winding, reeling and intermittant feeding of strip material, such as motion picture film, including reels and spindles for carrying a reach or run of film, a take up reel or separate sprocket appling tension to the film material to draw it past a point, a reciprocative pin to be received within the apertures of the film to restrain movement thereof against the applied tension, a disabling electromagnetic device responsive to a code recorded on a separate medium to withdraw the pin from the aperture in the film to allow the film to move responsive to the tension, and a light source and shutter positioned to project light through the film material at such time as the film is being restrained from movement by the pin.

8 Claims, 15 Drawing Figures

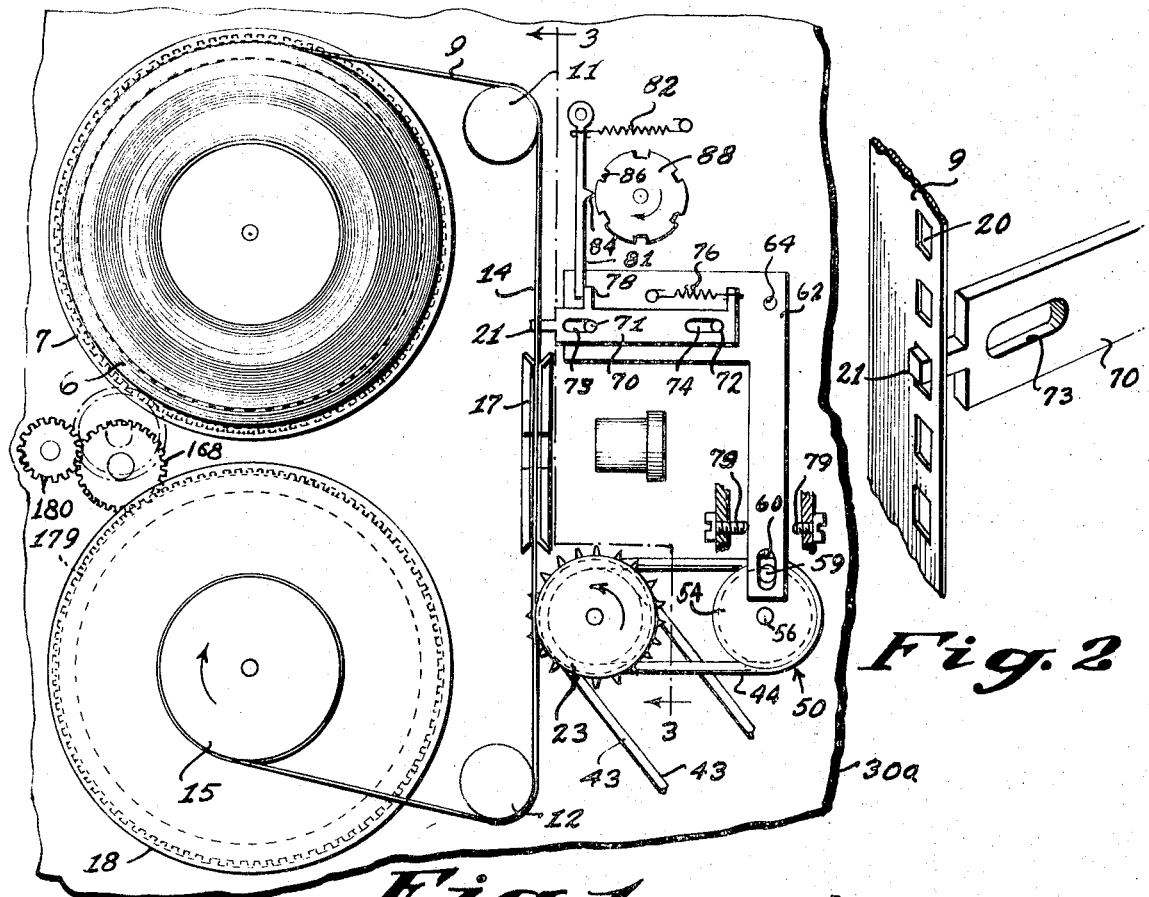
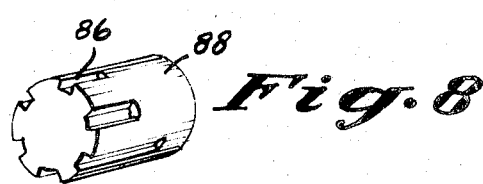
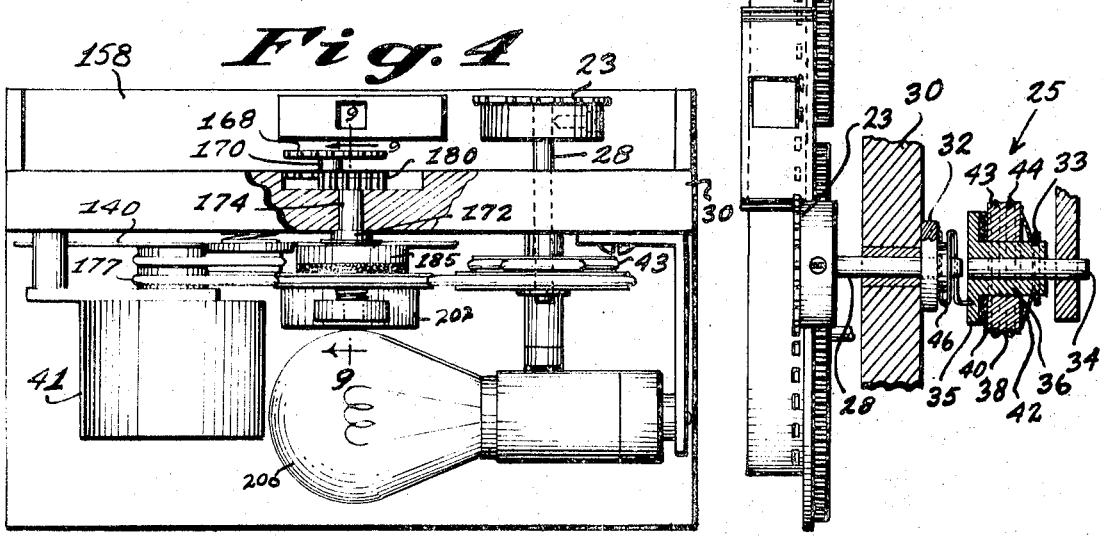

PATENTED AUG 20 1974 3,830,565

APPARATUS FOR INTERMITTANT FEEDING OF STRIP MATERIAL

Motion picture film handling and conveying apparatus has, for an extended period of time, been designed to operate at several discrete rates of speed, such as 18 or 24 frames per second. With such a system, where a "still" scene is to be filmed, it is necessary to expose whatever number of feet of film is necessary to project the still image for the length of time desired to view it.

Furthermore, the prior art has not provided a simple device for combining the advantages of the "film strip" or "slide" projector with those of a motion picture projector.

It is therefore the primary object of the present invention to provide a film projector and associated camera equipment which will be simple and straightforward in its mechanical considerations and yet will provide a combination "slide," or single frame projection, with motion picture film projection at any desired rate up to a practical maximum.

Another important aspect of the invention is the ability of the device to be syncronized with an accompanying sound track where the sound track carries indicia for controlling the speed at which the strip material is made to move past a given point.

A still further object of the invention is to provide variable speed rates for the strip material as a function of pulses or other indicia programed onto a separate sound track carrier.

Other and further objects, features and advantages of the present invention will become apparent from a reading of the following specification taken in connection with the accompanying drawings in which:

FIG. 1 is a diagramatic side elevational view of movie projection apparatus constructed in accordance with the principals of the present invention.

FIG. 2 is an enlarged perspective view of a portion of a film strip and the speed control pin inserted in one aperture thereof.

FIG. 3 is a cross-sectional view taken along lines 3—3 of FIG. 1.

FIG. 4 is a top plan view of a preferred form of the apparatus of the present invention with a portion of the body member broken away and shown in cross section.

FIG. 8 is a perspective view of a mechanical cam for controlling the film speed of the apparatus of the present invention.

Figure 5:
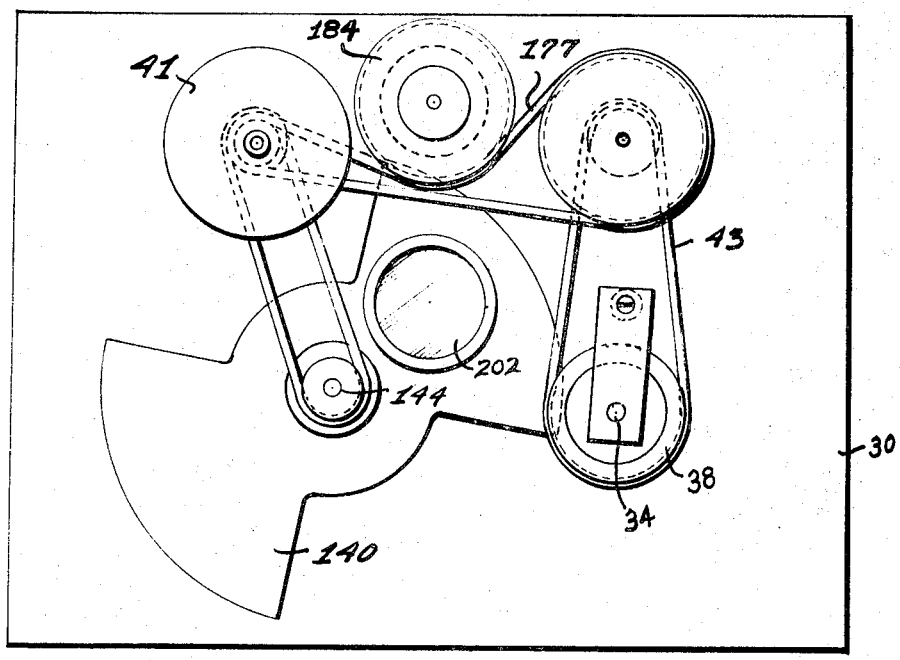
FIG. 5 is a rear elevational view of the apparatus shown in FIG. 4.

Referring now to the drawings for a more detailed explanation of a preferred form of the invention, FIG. 1 is illustrative of a structure having the basic elements of the simplified strip material transport system of the present invention. A supply spool 6 having a flange 7 is rotatably mounted and carries a supply of unprojected or unexposed motion picture film, for example.

From the supply spool 6, the film material 9 is directed over a pair of idler wheels 11 and 12 and is then attached to the take-up spool 15 which has a flange 18. The take-up spool 15 reels the strip material 9 which is paid off the supply spool 6, around the first idler wheel 11, and forms a reach or run 14 before being directed around idler wheel 12 and to take-up spool 15.

The strip material is wound onto the spool 15 by the attachment of the end of the strip of film to the spool and by rotating the spool in a manner well known to the art. The process of rotating the spool 15 and winding the film draws the film or strip material 9 past a film gate 17 and at the same time pulls it from the supply reel 6. However, if constant tension was to be thus applied to the strip material by application of torque to the spool 15, the strip material would run past the gate 17 in a manner and at a rate not suitable for scanning or projection of an image or series of images appearing on the film material. As in prior art motion picture devices, the strip material must be moved intermittently, that is, it must be temporarily stopped for either exposure or projection, depending on whether the apparatus is a camera or projector.

As is common to most photographic film, a number of spaced apertures 20 are provided along the longitudinal length of the film 9 to engage the teeth of one or more sprockets in the strip drive mechanism.

Intermittent film strip movement is accomplished in the present apparatus by a reciprocative pin 21 positioned perpendicularly to the reach 14 of the film 9 and in line with the apertures 20 of the film 9. When the pin 21 is inserted in one of the apertures 20 (see FIG. 2), the motion of the film past a point is abruptly stopped, allowing time to formulate or project an image on a portion of the film strip.

Movement of the strip through the film gate is continued by disabling the stop pin 21, that is, retracting it from the aperture 20. Before detailing the preferred and alternate forms of disabling the pin 21, it should be noted that the preferred form of the device contains a supplemental means for producing tension in the film strip which is preferred over the method of using only the rotation of the take-up spool 15. Tension or driving force is imparted to the film strip 9 by means of a drive sprocket 23.

Details of the sprocket 23 and its drive means are best illustrated in FIG. 3. A slipping clutch assembly 25 interconnects a motor shaft and the sprocket 23 in order that constant torque may be applied to the sprocket, even when the pin 21 is preventing movement of the strip material 9 and rotation of the sprocket 23.

The sprocket 23 is secured to the end of a shaft or spindle 28 which is journaled for rotation in a structural wall 30 of the device. Fixedly mounted on the other end of the shaft 28 is a disc 32. Spaced from the shaft 28, and co-axial therewith, is a second shaft 34 fixed in a structural mounting. Rotatable on said second shaft 34 is a circular clutch plate 35 having an elongated hub 36 which is fixed in longitudinal position on the shaft 34 by a "C" washer 33 engaging the end of the hub 36. Mounted for rotation on the hub 36 is a sheave 38 having two spaced apart annular grooves for accommodating two different drive belts 43 and 44. Also mounted on the hub 36 and disposed between the wheel 35 and the sheave 38 is an annular felt washer 40 to provide a friction drive between the sheave 38 and the clutch plate 35. A spring washer 42 positioned between the sheave 38 and the "C" washer provides a biasing force against the sheave 38 to increase the frictional drag created by the felt washer 40 against the clutch plate 35 to turn the wheel when its load (shaft 38 and the sprocket 23) is turnable, that is, when it is not locked in a stop position by insertion of the pin 21 in the film aperture 20. If the sprocket 23 is not turnable, that is, if the strip material is being prevented from moving by the pin 21 being inserted in an aperture 20, then the sheave 38 continues to rotate through the drive force of belt 43 and the clutch plate 35 slips against the felt washer 40 without itself rotating.

One notable feature of the clutch arrangement is the coupling between the clutch 25 and the sprocket drive shaft 28. A volute spring 46 concentric with the shaft 28 is attached at one of its ends to the disc 32 and at its other end to the wheel 35. The torque produced by the turning of the plate 35 is transmitted through the winding up of the coils or turns of the volute spring 46 to the disc 32, producing rotation of the sprocket shaft 28. At such time as the sprocket shaft is prevented from moving, however, the plate 35 winds up the spring 46 before the wheel 35 is forced to stop turning, thus storing energy in the spring 46 which is suddenly released when the film strip is allowed to move again. The stored spring energy assures positive and aggresive drive torque to the sprocket 23 and consequently immediate movement of the film strip at the instant of its release by the pin 21.

Referring again to the mechanism of the clutch 25, it is seen that the clutch sheave 38 may serve a dual purpose. First and always, it serves to deliver drive torque from the motor 41. The torque is transmitted by drive belts 177 and 43 (see FIG. 5). Second, the sheave may be provided with a second belt 44 which is used to transmit torque to a registration clutch assembly 50. The registration clutch and the second drive belt 44 are illustrated in the diagramatic views of FIGS. 1, 12 and 13, but for clarity are not shown in the FIG. 5 embodiment.

Figure 12:
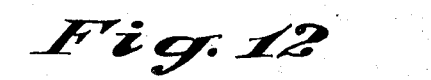
FIG. 12 is a diagramatic side elevational view of a second embodiment of film image registration means whereby the speed control pin is adjusted to establish registration.
Figure 13:
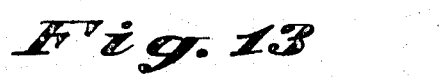
FIG. 13 is a cross-sectional view taken along lines 13—13 of FIG. 12.

The registration clutch assembly 50 is illustrated in FIGS. 1, 12 and 13. It comprises a sheave 52 driven by the belt 44, which sheave is rotatable on the hub 53 of a drive wheel 54. The drive wheel 54 is mounted on a fixed shaft 56 similar to the shaft 34 in the sprocket drive clutch assembly 25. Also like clutch 25, a felt washer 57 is disposed between the sheave 52 and the drive wheel 54 to provide frictional drive therebetween. Positioned near the periphery of the drive wheel 54 is a pin 59 which protrudes from the outer surface of the wheel 54 into a slot 60 in the lower end of the reciprocative pin mounting bracket 62.

The bracket 62 is pivotally mounted at point 64 (FIG. 1) to permit a small amount of pivotal rotation of the bracket about said point 64 in response to the rotative position of the clutch pin 59. When the direction of strip material movement is reversed, by reversal of the motor direction, the direction of drive of the belt 44 will also be reversed, thus rotating the drive wheel 54 and its associated pin 59 within the limits established by the slight rotation of the bracket 62 about its pivot point 64. Rotative movement of the wheel 54 causes the bracket 62 to also move about its pivot point 64 and the limitation imposed on movement of bracket 64 acts also to limit the rotation of the wheel 54.

The purpose of the pivotal movement of the bracket 62 is to assure proper registration of the optics, light sources and image on the film strip 9. Inasmuch as the apertures 20 in the film strip are longitudinally larger than the same dimension of the pin 21, it is necessary to displace the pin upwardly or downwardly, depending upon the direction of the film strip in order to assure proper positioning or registration of the film strip regardless of its direction of travel.

It will be seen that as the bracket 62 pivots about its center point 64, the pin 21 will be moved in a direction which is longitudinally in alignment with the reach 14 of the film strip 9. The amount or extent of registration movement of the pin 21 is limited by an adjustable pair of opposed stop screws 79 positioned on opposite sides of the leg of the bracket 62.

Figure 11:
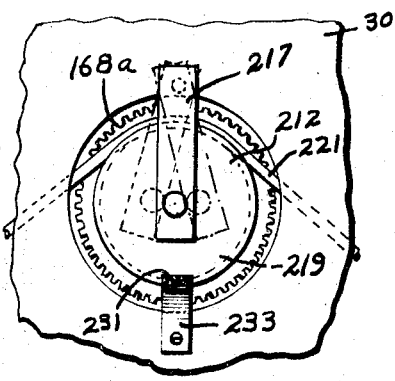
FIG. 11 is a side elevational diagramatic view of one embodiment of apparatus for controlling the registration of the film images as a function of the direction of film movement.

An alternative system of image registration is seen in FIG. 11 where the drive wheel 54a of the registration clutch 50 is provided with a mirror 66 which is positioned in the propagation path 67 of the radiant energy (light) being used to project the film strip image. Instead of altering the position of the pin 21, the mirror 66 is tilted as a function of the direction of drive belt 44 rotation, thus altering the optical portions of the system so as to maintain proper registration. A pair of adjustable stop screws 80 limit the rotation of the wheel 54a.

Fundamental to the operation of the apparatus of the present invention is the reciprocative operation of the strip material stop pin 21. FIG. 1 is illustrative of a simple mechanical system which allows the film strip to be driven at a constant speed. The pin body 70 is slideably mounted on the bracket 62 by a pair of mounting pins 71 and 72 disposed within slots 73 and 74 respectively of the pin body. A tension spring 76 provides a biasing force to the pin body that urges the pin 21 into the apertures 20 of the film strip 9. A raised ear 78 on the pin body is arranged to be in contact with a lever arm 81, which arm is urged by a second tension spring 82 to remove the pin 21 from the apertures 20. The lever arm 81, however, is prevented from moving in accordance with the force of the spring 82 and removing the pin, as aforesaid, except when the cam 84, integral with the lever 81, is allowed to drop into one of the detents 86 on a rotating drum 88. A typical drum 88 is illustrated in FIG. 8 and illustrates one embodiment of such drum where sets of detents are provided, each set having different longitudinal lengths along the periphery of the drum 88. The speed of the film srip can be regulated by positioning the cam 84 at a discrete longitudinal position on the periphery of the drum 88, thereby selecting the number of detents which will be encountered by the cam for each revolution of the drum 88. Such a mechanical arrangement for selecting the speed of the strip material could be advantageously employed in such apparatus as a film editor.

Figure 6:
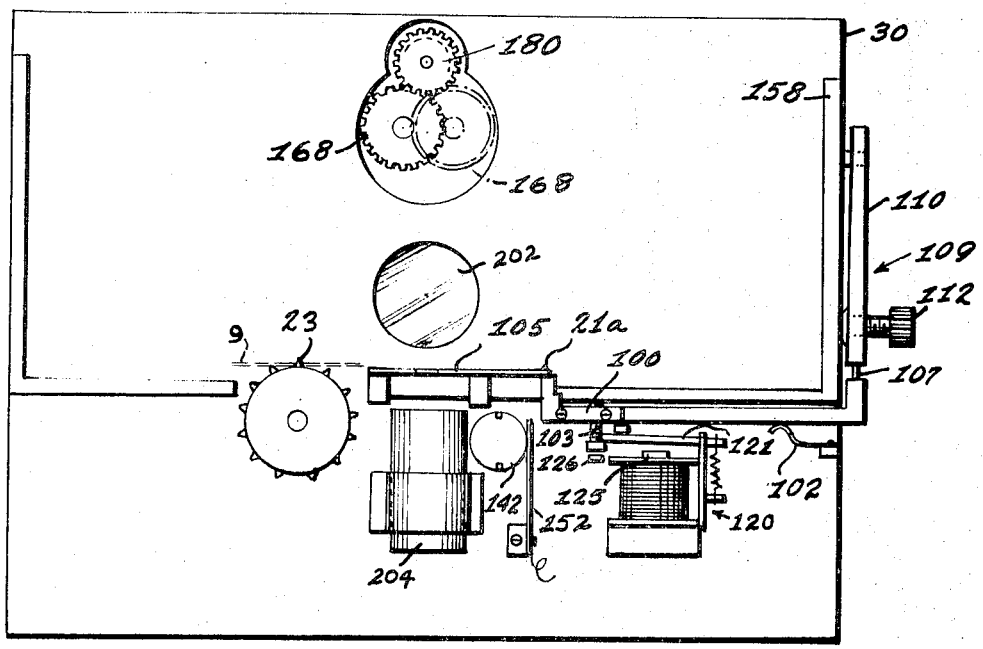
FIG. 6 is a front elevational view of the apparatus shown in FIG. 4.

The preferred form of the strip material speed control is shown in FIG. 6. This embodiment replaces the mechanical cam and drum arrangement of FIG. 1 with an electrically operated pin retraction system which is controlled by information stored on a separate record or medium. In the embodiment of FIG. 6, which does not show the film or film spools, a modified strip material stop pin 21a is shown protruding through an opening in the film gate 105 in a position where the pin can be inserted in the aperture 20 of the film 9 in the same manner as the pin 21 of FIGS. 1 and 2. The modified pin 21a is mounted on the end of a pivotal lever arm 100 which is pivotal at a hinge point 107. The hinge 107 connects the lever 100 to a framing adjustment assembly 109. A bar 110 is fastened to a base member at its one end and carries the hinge 107 at its free end. An adjustment screw 112 is threadingly engaged to the bar 110 and abuts against the base member so that as the screw 112 is turned the free end of the bar 110 is moved substantially axially along the screw, thereby moving the pin 21a lengthwise of the film 9 in order to provide initial registration of the film image and the optical system, a process known as framing.

An electric solenoid 120 with an arm 121 is positioned below the pin lever 100. The free end of the solenoid arm is connected to the lever 100 by means of a screw 103 which protrudes through the lever arm 100 and abuts against the base member. Adjustment of the screw 103 establishes the depth of penetration of the pin 21a. Actuation of the solenoid 120 will cause the arm 121 to be pulled down into contact with the solenoid armature 125, which movement withdraws the pin 21a from the aperture 20 in the film 9, thus allowing the sprocket 23 to pull the film through the film gate 105. In order that only one frame or one image be presented at a time, it is necessary that the pin 21a be ready to drop into the next film aperture 20 as it passes the pin aperture in the film gate. Consequently, the apparatus is arranged so that as soon as the pin 21a has been withdrawn from a given aperture, the solenoid is deactivated, allowing the pin 21a to immediately penetrate the next aperture and thereby stop the film strip to allow projection of the next image. Deactivation of the solenoid is accomplished by the circuit means shown in FIG. 7.

Immediately following the retraction of the pin 21a from the film aperture 20, the solenoid arm 121 makes contact with a switch contact 126 which is connected to a source 127 of power. Through electrical connection 128, the voltage from source 127 is applied to the relay drive circuit 130, disabling the output function of the driver and de-actuating the solenoid, thus releasing the arm 121 and permitting the pin to be inserted in the next available film aperture by means of the biasing force of a return spring 102.

Figure 7:
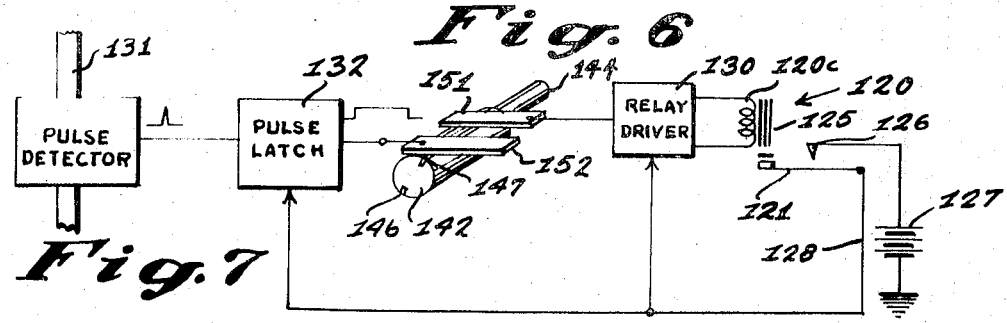
FIG. 7 is a functional block diagram of the electrical circuitry of the film speed control apparatus of the present invention.

The electrical elements shown in FIG. 7 are themselves state of the art devices and hence will not be explained in detail other than to illustrate their function in the combination of the preferred embodiment of the device. The relay driver 130 may be any one of several types of amplifiers, preferably solid state, which will provide the solenoid coil 120c with actuating power upon receipt at the input of the driver of an input signal derived from the pulse latch circuit 132. The pulse latch circuit may be any one of several types of latching or locking circuits which applies a constant voltage at is output after being triggered by a short duration pulse. The purpose of the latching circuit 132 is to hold a pulse until a certain condition is satisfied and then present it to the relay driver 130. The condition to be satisfied for communication of the pulse latch voltage to the relay driver is appropriate shutter position. The two bladed shutter 140 (FIG. 5) is positioned to interrupt the projection light beam twice for each revolution of the shutter. Since the film advance should be made during the time period that the shutter interrupts the light beam, a rotating switch drum 142, which is rotatable with the shutter shaft 144, is adapted to provide circuit continuity between the latch circuit 132 and the driver circuit 130 at the same time that the shutter blades 140 are interrupting the light beam. The circuit continuity is created by means of a pair of diametrically opposed conductors 146 and 147, which are layed longitudinally in the surface of the drum 142. Circuit continuity is achieved as the conductors pass beneath a pair of contacts 151 and 152 which are in contact with the surface of the drum 142 and one of the conductors 146 or 147.

It will be apparent that the combination of the drum 142 and the pulse latch circuit 132 provides the components of an "and" gate which will allow the film to be advanced to the next frame only at such time as the shutter is properly positioned to cut off projection light, thus avoiding flicker. It is also apparent that if a pulse is detected from the sound track prior to the time that the film should be advanced, the pulse will effectively be "stored" until the condition of shutter synchronization is present.

Figure 9:
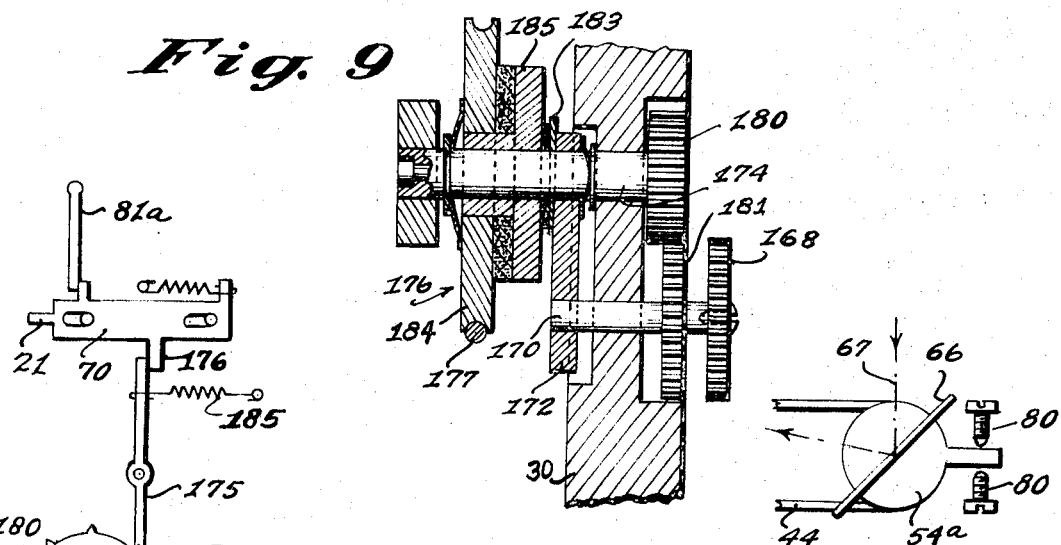
FIG. 9 is an enlarged cross-sectional view taken along lines 9—9 of FIG. 4.

In the preferred form of the invention, the strip material 9 is reeled upon the spools of a cassette or cartridge which fits within the frame 158 on the base member 30. The spools of the cassette or cartridge (not shown in FIG. 6) are equipped with drive gear means which are adapted to be engaged by a gear 168 which is driven through a clutch and gear arrangement 176 from the main drive motor 41 as shown in FIG. 9. The spools of the FIG. 1 apparatus are shown to be provided with concentric gears 179 in the same manner as the spools of the cassettes or cartridge.

The drive gear 168 is secured to a shaft 170 which is rotatably carried by a bracket 172 which is hung at its top end from a second shaft 174. The bracket 172 is rotatable on the shaft 174. The shaft 174 is driven through a slipping clutch assembly similar to the clutch 25. The sheave 184 is driven by a belt 177, which is driven from the output shaft of the motor 41 (See FIG. 5). It is apparent that if the motor 41 is reversed in the direction of its rotation, the direction of movement of the belt 177 is likewise reversed, as is the direction of rotation of the shaft 174. Mounted securely on the shaft 174 is a drive gear 180 which engages a second gear 181 mounted on the first shaft 170. Rotation of the gear 180 thus imparts rotation to the gears 181 and 168. A friction washer 183 is disposed on the shaft 174 between the clutch plate 185 and the bracket 172 in order that rotation of the clutch plate 185 will impart a pivotal motion to the bracket 172. The pivotal motion will be reversed as the direction of the clutch rotation is reversed. The purpose of the pivotal rotation of the bracket 172 is to position the gear 168 into engagement with the gear drive means of either the supply or take-up spool, depending on the direction of motor rotation, thus providing take-up and rewind capability. The pivotal action of the gear 168 is illustrated in FIGS. 1 and 6.

Figure 14:
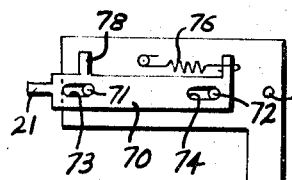
FIG. 14 is an enlarged cross-sectional view taken similarly to the cross sectional view shown in FIG. 9 but illustrating a second embodiment of that apparatus.
Figure 15:
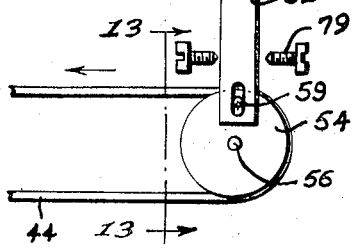
FIG. 15 is a front elevational view of the embodiment of the apparatus shown in FIG. 14.

A second embodiment of the pivotal drive gear arrangement is shown in FIGS. 14 and 15. A drive gear 168a, which functionaly corresponds with the gear 168 of the FIG. 9 embodiment, is fixed on the hub 210 of a clutch plate 212. The clutch plate is rotatably mounted on a shaft 215 carried at its one end by a bracket 217 which is pivotally mounted to the base structure 30. Spaced from the clutch plate and rotatably mounted on the hub 210 is a drive sheave 219 which bi-directionally is driven by a belt 221 interconnected to the motor 41 in a manner similar to the belt 177 of the FIG. 9 embodiment. A spring 223 reacting against a C-washer 225 presses the drive sheave against a felt pad 229 which is concentric with the hub 210 and disposed between the sheave 219 and the clutch plate 212. A second felt pad 231 is disposed against the rim of the clutch plate by light pressure provided by a leaf spring 233. In operation, as the belt 221 turns the sheave 219, the frictional forces provided by the felt washer 229 imparts rotation to the clutch plate 212. As the clutch plate and its integral hub 210 begin to turn a tangential reaction force is developed between the rim of the clutch plate and the felt pad 231 which results in pivotal motion of the bracket 217. The pivotal motion is described by the phantom lines representing the bracket in FIG. 15. As the bracket pivots from one extreme position to another, depending on the direction of motion of the drive belt 221, the gear 168a engages one or the other of the film spool gears in the same manner as described for the embodiment of FIG. 9.

Figure 10:
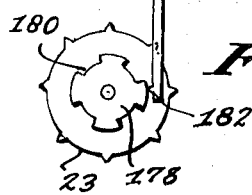
FIG. 10 is a diagramatic side elevational view of apparatus for controlling film advance for a plurality of frames at a time.

A further modification of the mechanical pin arrangement of FIG. 1 is illustrated in FIG. 10. The lever arm 81a is shown diagramatically as the actuating lever to displace or withdraw the pin 21 from the film aperture. The lever 81a may be mechanically actuated as is lever 81 of FIG. 1, or the lever 81a may be actuated by an electric solenoid as is the lever 121 of the embodiment of FIG. 6. The object of the modified form of apparatus of FIG. 10 is to permit a double frame advance of the strip material. When using the apparatus of this invention for motion picture films, for example, it may be desireable to provide a lens arrangement whereby a length of film equivalent to two single frames may be exposed or projected at one time. In order to accomplish this purpose, a second cam lever 175 is pivotally disposed below the pin body 70 and a protruding pin body ear 176 in order that the pin 21 may not be returned to or inserted in the film apertures until a length of film material equivalent to two frames has passed through the film gate. A cam 178 attached for rotation with the sprocket 23 contains detents 180 providing proper spacing for allowing the double frame advance of the strip material.

It is apparent that when the cam rider 182 of the lever 175 is riding on the raised portion of the cam 178, the pin 21 will be able to advance and be inserted into the aperture of the film; however, as the follower 182 goes into a detent 180, the lever 175 is allowed to pivot under the urging of a bias spring 185, thus placing the upper end of the lever 175 in a position to obstruct the return of the pin body 70 to a position where the pin 21 can be reinserted into a film aperture.

The various embodiments of the invention have been shown and described as they would appear in a film projector, the light source 200 and lenses 202 and 204 being a part of the optical system for projection of an image fixed on the film. It is contemplated that in the embodiment of FIGS. 4 and 6 that the radiant light energy from the bulb 200 would pass through a lens 202 and onto an angulated mirror (a part of the film cartridge and consequently not shown) where the light would be deflected 90° to pass through the film 9 and through a projection lens 204. Other optical arrangements can adequately serve the purposes of the invention. Although the present apparatus is shown in a projector environment, the principles of the invention apply equally to cameras where, instead of projection optics, the apparatus would contain camera optics for focusing an image on the film strip during the time the strip movement was being retarded.

It is also to be understood that where the term "radiant energy" is used in this specification, it is intended to include the broader principles of projecting or fixing images by electronic or electromagnetic means, the invention being adaptable by those skilled in the art not only to photographic film devices, but to those of the television art as well.

Having described the details of the apparatus, a further brief explanation of its operation is appropriate. As pointed out in the fore part of this specification, the object of the invention is to provide a projector for filmed images which will be a combination of a single frame projecting device and one which can project motion pictures as well. Such a novel objective is advantageously accomplished by the apparatus just described when the making of the film strip is pre-programed with the sound track which must necessarily be made on a separate carrier 131. Separation is required because the sound track carrier must proceed at a constant speed while the photographic film may be moved at many different rates of speed and will, under most cases, be stopped entirely for extended periods of time.

Therefore, it is convenient to record the sound track on magnetic tape 131, for example, and play the tape by well known means. It is also convenient and desireable to record on the sound track tape a separate channel or track containing pulses, or other magnetically fixed indicia, which will control the rate of movement of the film as described in relation to the apparatus of FIG. 6. It is understood of course that the rate of film advance will probably not be constant, for example, the sound track presentation might require several minutes to describe or comment on the image being projected from a single frame. In such a case, the film rate indicia track on the sound carrier would contain a recorded pulse at the end of the single frame narration which would then create movement of the film to the next frame. The film advance pulses are recorded in programed fashion on the sound track carrier to create whatever rate or changing rate of film advance as is appropriate for the planned presentation.

Manual or artifically generated and controlled pulses can also be utilized to operate the film handling apparatus, over and above the pulse track contained on the sound track carrier 131.

One particular advantage of apparatus of this invention is the potential for rapid advance or rewind where it is desired to skip a portion of the film and position it rapidly to view images which are either ahead or behind. By withdrawing the pin 21 or 21a and keeping it withdrawn, the constant tension on the film will pull it through the film gate, either forward or in reverse, at a high rate of speed. Once the film has been repositioned by either manually inserted pulses (forward or in reverse depending on the force direction of the tensioning device which in turn is a function of the direction of rotation of the motor 41), or by the aforesaid faster means of skip and rewind, it is apparent that the synchronization between the sound track and the film strip must be re-established. Such requirement leads to a yet further advantage of the present invention.

A third track on the sound carrier is preferably utilized as a synchronizing track upon which is recorded a pluarity of indicia or codes which match similar coding on the film frames which are programmed to be projected coincident with the playback of the matching part of the sound track. Such syncronizing can be achieved by the use of electronic codes on the synchronizing track which are compared to optically perceived matching codes on the film strip. The codes are electronically compared by means well known to the electronic art. A simpler and more inexpensive means of implementing the synchronizing method, however, is to record on the synchronizing track a voice recording of a reference to a certain matching frame number such as "frame 37 . . . frame 38." Fixed on each film frame in an unobtrusive location is a small reference number intended to match the number being called out on the synchronizing track. When the film is positioned as desired, it is noted what number frame is being projected, then while listening to the synchronizing track, the sound track carrier is advanced or rewound to that point where the code (voice) matches that of the projected film image. Once synchronization is regained, the film advance pulse track will again control the movement, either forward or in reverse, of the film strip.

I claim:

1. Apparatus for intermittent feeding of strip material of indeterminate length which strip material has longitudinally spaced apertures, said apparatus comprising in combination:
   means carrying a reach of said material between two points;
   means operatively engaging said strip material for producing tension therein and drawing it past a point on the reach;
   a reciprocative pin positioned and adapted to engage the apertures in said material to restrain movement thereof against the force of said tension producing means;
   disabling means operative on said pin for withdrawing the pin from an aperture and disabling the restraining function; and
   means positioned and adapted for propagating radiant energy to said strip material;
   axially spaced supply and take-up spools for reeling said strip material, and wherein said tension means includes:
   means interconnecting the end of the strip material to the take-up spool;
   torque producing means connected to one of said spools;
   sprocket means engaging the apertures of the film material at a point along the reach thereof; and torque producing means connected to the said sprocket means, including
   a motor having an output drive shaft;
   a first rotatable shaft mounting said sprocket means and having a drive disc mounted thereon;
   a second shaft coaxial with said first shaft and having clutch means mounted thereon;
   drive means interconnecting the said motor output drive shaft and the clutch means;
   elastic coupling means interconnecting the clutch means and the drive disc.

2. The combination of claim 1 wherein said clutch means comprises:
   a clutch plate having an elongated hub mounted for rotation on said second shaft;
   a drive sheave rotatably mounted on said elongated hub and operably connected to the said drive means;
   friction means disposed between the said sheave and clutch plate; and
   means biasing said sheave toward said clutch plate.

3. The combination of claim 2 wherein said elastic coupling means comprises a volute spring having one end attached to the drive disc and the other attached to the clutch plate.

4. Apparatus for intermittent feeding of strip material of indeterminate length which strip material has longitudinally spaced apertures, said apparatus comprising in combination:
   means carrying a reach of said material between two points;
   means operatively engaging said strip material for producing tension therein and drawing it past a point on the reach;
   a reciprocative pin positioned and adapted to engage the apertures in said material to restrain movement thereof against the force of said tension producing means;
   disabling means operative on said pin for withdrawing the pin from an aperture and disabling the restraining function;
   means positioned and adapted for propagating radiant energy to said strip material;
   axially spaced supply and take-up spools for reeling said strip material, and wherein said tension means includes:
   means interconnecting the end of the strip material to the take-up spool;
   torque producing means connected to one of said spools, including:
   gear means concentric with and connected to said spools;
   a drive shaft having a drive gear fixed thereon;
   clutch means operably connected to said shaft for turning said shaft;
   a bracket pivotally mounted on said shaft and carrying two rotatable coaxial gears;

friction means disposed between the said clutch and the bracket to impart pivotal movement to said bracket upon rotation of the clutch means, and wherein one of said coaxial gears engages said drive gear on the drive shaft and the other of said coaxial gears engages the gear means connectd to one of the spools.

5. Apparatus for intermittent feeding of strip material of indeterminate length which strip material has longitudinally spaced apertures, said apparatus comprising in combination:
means carrying a reach of said material between two points;
means operatively engaging said strip material for producing tension therein and drawing it past a point on the reach;
a reciprocative pin positioned and adapted to engage the apertures in said material to restrain movement thereof against the force of said tension producing means;
disbaling means operative on said pin for withdrawing the pin from an aperture and disabling the restraining function; and
means positioned and adapted for propagating radiant energy to said strip material;
axially spaced supply and take-up spools for reeling said strip material, and wherein said tension means includes:
means interconnecting the end of the strip material to the take-up spool;
torque producing means connected to one of said spools, including:
gear means concentric with and connected to the spools;
a pivotally mounted bracket;
a shaft carried by said bracket, said shaft being parallel to the axis of rotation about which the bracket is pivotal;
a clutch plate having an elongated hub rotatably mounted on the shaft;
drive means operably connected to the clutch plate;
an output drive gear fixed on the said clutch plate hub; and
friction means disposed in contact with the clutch plate.

6. Apparatus for intermittent feeding of strip material of indeterminate length which strip material has longitudinally spaced apertures, said apparatus comprising in combination:
means carrying a reach of said material between two points;
means operatively engaging said strip material for producing tension therein and drawing it past a point on the reach;
a reciprocative pin positioned and adapted to engage the apertures in said material to restrain movement thereof against the force of said tension producing means;
means positioned and adapted for propagating radiant energy to said strip material;
a rotatably mounted shutter having a plurality of radially extending blades, positioned in respect to the path of propagation of the radiant energy so that said blades will interrupt said propagation as said shutter is rotated;
motor means connected to said shutter; and
disabling means operative on said pin for withdrawing the pin from an aperture and disabling the restraining function responsive to indicia carried by an auxillary record, said disabling means comprising:
electric pulse detecting means;
means responsive to the detected pulse for producing a constant voltage output;
a solenoid having an armature and a coil, said armature connected to said pin; and
means responsive to the angular position of the shutter and interconnecting the constant voltage responsive means and the coil of the armature to provide circuit continuity in at least one angular position of the said shutter.

7. Apparatus for intermittent feeding of strip material of interminate length which strip material has longitudinally spaced apertures, said apparatus comprising in combination:
means carrying a reach of said material between two points;
means operatively engaging said strip material for producing tension therein and drawing it past a point on the reach;
a reciprocative pin positioned and adapted to engage the apertures in said material to restrain movement thereof against the force of said tension producing means;
disabling means operative on said pin for withdrawing the pin from an aperture and disabling the restraining function;
means positioned and adapted for propagating radiant energy to said strip material; and
axially spaced supply and take-up spools for reeling said strip material, and wherein said tension means includes:
means interconnecting the end of the strip material to the take-up spool;
torque producing means connected to one of said spools, including:
gear means concentric with and connected to the spools;
a pivotally mounted bracket;
a shaft carried by said bracket, said shaft being parallel to the axis of rotation about which the bracket is pivotal;
a clutch mounted on the shaft;
drive means operably connected to the clutch;
an output drive gear carried by the shaft and operably connected to the clutch; and
friction means in contact with the clutch.

8. Apparatus for intermittent feeding of strip material of indeterminate length which strip material has a plurality of images spaced longitudinally there along and longitudinally spaced apertures, said apparatus comprising in combination:
means carrying a reach of said material between two points;
means operatively engaging said strip material for producing bi-directional tension therein and drawing it past a point on the reach;
a reciprocative pin positioned and adapted to engage the apertures in said material to restrain movement thereof against the force of said tension producing means;

disabling means operative on said pin for withdrawing the pin from an aperture and disabling the restraining function; and means positioned and adapted for propagating radiant energy to said strip material, and registration means operatively connected to said tension means and responsive to the direction in which tension is applied to the strip material for positioning each respective one of said images within the path of propagation of said radiant energy, wherein said registration means includes:

clutch means;

mirror means disposed in the propagation path of said radiant energy and operably connected to said clutch means; and means interconnecting said clutch to said tension means.

* * * * *